(12) United States Patent
Lo et al.

(10) Patent No.: US 9,719,553 B2
(45) Date of Patent: Aug. 1, 2017

(54) ROTATION DRIVE DEVICE

(71) Applicant: HIWIN TECHNOLOGIES CORP., Taichung (TW)

(72) Inventors: Yi-Ting Lo, Taichung (TW); Chin-Yen Su, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 24 days.

(21) Appl. No.: 14/981,766

(22) Filed: Dec. 28, 2015

(65) Prior Publication Data

US 2017/0184145 A1    Jun. 29, 2017

(51) Int. Cl.
*F16C 3/04* (2006.01)
*F16C 3/06* (2006.01)
*F16H 19/00* (2006.01)
*B25J 18/04* (2006.01)

(52) U.S. Cl.
CPC ............. *F16C 3/06* (2013.01); *F16H 19/005* (2013.01); *B25J 18/04* (2013.01); *Y10S 901/19* (2013.01)

(58) Field of Classification Search
CPC ...... F16C 3/04; F16C 3/06; F16C 3/08; F16C 3/18; F16C 3/20; F16H 19/001; F16H 19/003; F16H 19/005; Y10S 901/19; Y10S 901/21; Y10S 901/25; B25J 18/04
See application file for complete search history.

(56) References Cited

U.S. PATENT DOCUMENTS

| 8,960,042 B2 * | 2/2015 | Liu | B25J 9/102 74/490.03 |
| 2012/0103127 A1 * | 5/2012 | Liu | B25J 17/0283 74/490.06 |
| 2016/0089778 A1 * | 3/2016 | Yokota | B25J 9/06 74/490.01 |
| 2016/0101518 A1 * | 4/2016 | Saito | B25J 9/0009 74/490.03 |

FOREIGN PATENT DOCUMENTS

JP        2002239966 A     8/2002

* cited by examiner

*Primary Examiner* — Adam D Rogers
(74) *Attorney, Agent, or Firm* — Bruce Stone LLP; Joseph Bruce

(57) ABSTRACT

A rotation drive device includes a crankshaft which has two ends dynamically connected to a drive source and a driven device, respectively. The drive source drives the crankshaft to rotate the driven device. The crankshaft structurally changes to make the two ends of the shaft portion connected to the rotation drive portion and the driven portion, respectively, at different central angles, which divides the space into two subspaces which are located two sides of the shaft portion, so that the wire can be arranged in the subspaces at both sides of the shaft portion, thus enhancing the flexibility of wire distribution while improving rotation range of motion.

7 Claims, 12 Drawing Sheets

ROTATION DRIVE DEVICE

BACKGROUND OF THE INVENTION

Field of the Invention

The present invention relates to a drive device, and more particularly to a rotation drive device.

Related Prior Art

With the maturation of automation, automatic machines must employ various drive devices to perform different automatic operations, and most of the drive devices are generally categorized into devices of linear motion and rotation motion. As shown in FIG. 1, inside an articulated robot arm 10 is provided a drive source 11 which dynamically connected to a crankshaft 12, and the crankshaft 12 drives a driven device 13 to rotate.

The crankshaft 12 includes a driven portion 123, a shaft portion 122 and a drive portion 121 which are sequentially connected to one another. The drive portion 121 has a diameter smaller than the driven portion 123, and the drive portion 121 and the driven portion 123 are concentrically arranged. The shaft portion 122 has two ends connected to the drive and driven portions 121, 123 at the same central angle of a circle. The same central angle refers to the positions of the two ends of the shaft portion 122, under the condition that the drive portion 121 and the driven portion 123 are concentric with each other.

Since the two ends of the shaft portion 122 are located at the same central angle, namely, the shaft portion 122 extends along the outmost periphery of a space between the drive and driven portions 121, 123, wires can only be allocated at one side of the shaft portion 122, that will adversely affect the rotation angle of the driven device 13, and increase the wear ratio of the wire. Besides, the wiring space of the existing hollow gear reducer is limited by the diameter of the hollow shaft. A large-diameter hollow shaft may provide a bigger wiring space but will increase the size and cost of the robot arm, and will also unfavorably affect the flexibility of the robot arm.

The present invention has arisen to mitigate and/or obviate the afore-described disadvantages.

SUMMARY

The present invention is aimed at providing a rotation drive device, which overcomes the abovementioned disadvantages of the crankshaft of the conventional rotation drive device, such as wiring restriction, restricted rotation angle, increased wire wear ratio, and low flexibility.

Therefore, a rotation drive device provided by the invention comprises:

a drive source;

a crankshaft with one end connected to and rotated by the drive source, the crankshaft sequentially including a rotation drive portion, a shaft portion and a driven portion, the shaft portion having two ends connected to the rotation drive portion and the driven portion, respectively, the rotation drive portion including a terminal-end-surface center point formed at a center of a terminal end surface of the rotation drive portion, the driven portion including a terminal-end-surface center point formed at a center of a terminal end surface of the driven portion, the two terminal-end-surface center points are concentric with each other, wherein a circle is centered on the two terminal-end-surface center points, the two ends of the shaft portion are connected at different central angles of the circle to the rotation drive portion and the driven portion, respectively, the shaft portion sequentially includes a first connecting section connected to the rotation drive portion, a second connecting section connected to the driven portion, and an extension section connected between the first and second connecting sections; and a driven device connected to another end of the crankshaft and driven to rotate by the crankshaft.

The crankshaft of the present invention structurally changes to make the two ends of the shaft portion connected to the rotation drive portion and the driven portion, respectively, at different central angles, which divides the space into two subspaces which are located two sides of the shaft portion, so that the wire can be arranged in the subspaces at both sides of the shaft portion, thus enhancing the flexibility of wire distribution while improving rotation range of motion.

DETAILED DESCRIPTION

The present invention will be clearer from the following description when viewed together with the accompanying drawings, which show, for purpose of illustrations only, the preferred embodiment in accordance with the present invention.

Referring to FIGS. 2-12, a rotation drive device in accordance with a preferred embodiment of the present invention comprises: a drive source 20, a crankshaft 30, and a driven device 40.

The drive source 20 includes a rotatable drive shaft 21.

Figure 7:
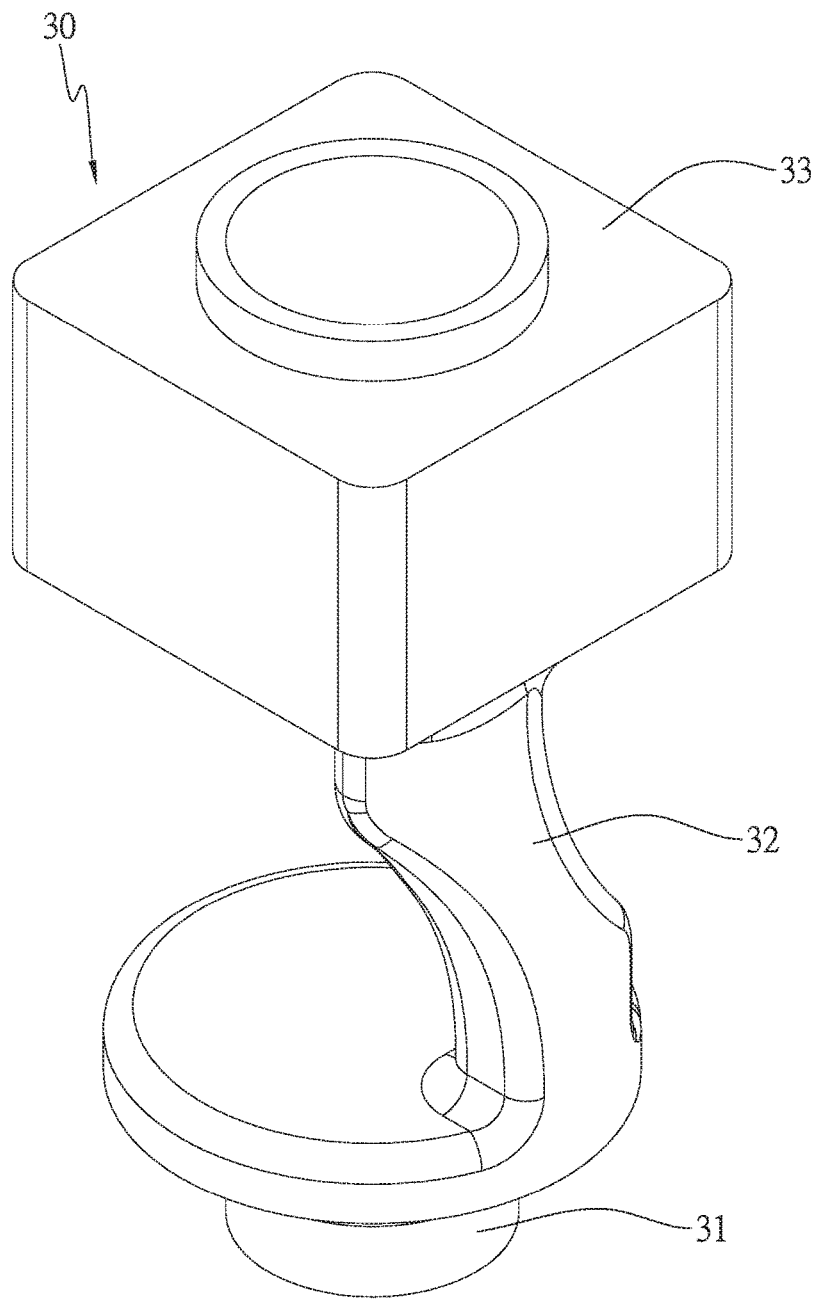
FIG. 7 shows a crankshaft of the preferred embodiment of the present invention with a rectangular-shaped drive portion.
Figure 8:
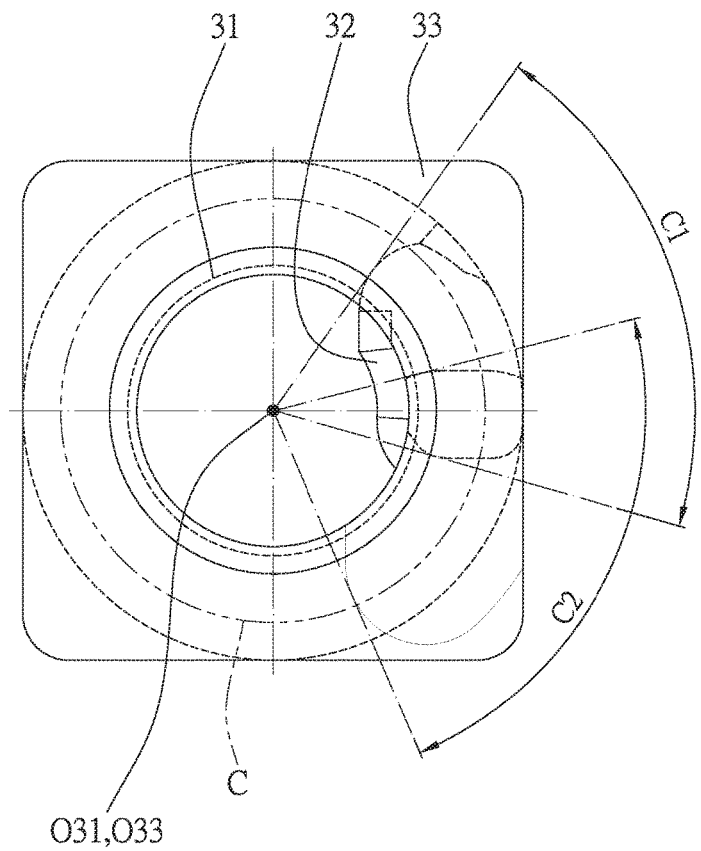
FIG. 8 is a bottom view of FIG. 7.

The crankshaft 30 has one end connected to and rotated by the drive source 20. In this embodiment, the drive source 20 is connected to the crankshaft 30 by a belt 22 wound around the drive shaft 21 and the crankshaft 30. The crankshaft 30 sequentially includes a rotation drive portion 31, a shaft portion 32 and a driven portion 33. In this embodiment, the rotation drive portion 31 and the driven portion 33 have a circular cross section, and the driven portion 33 is a hollow circular structure. Of course, the configuration of the rotation drive portion 31 and the driven portion 33 are not limited to this embodiment, and can be in any geometry shape. As shown in FIGS. 7 and 8, for example, the driven portion 33 can be rectangular shaped.

The rotation drive portion 31 has a terminal-end-surface center point O31 formed at a center of a terminal end surface of the rotation drive portion 31, the driven portion 33 also has a terminal-end-surface center point O33 formed at a center of a terminal end surface of the driven portion 33. The two terminal-end-surface center points O31 and O33 are concentric, and a direction connected between the two terminal-end-surface center points O31 and O33 is defined as an axial direction X. The shaft portion 32 has two ends connected to the rotation drive portion 31 and the driven portion 33, respectively. Since the two terminal-end-surface center points O31 and O33 are concentric with each other, suppose that there is a circle C centered on the terminal-end-surface center points O31, O33, then the two ends of the shaft portion 32 are connected at different central angles of the circle C to the rotation drive portion 31 and the driven portion 33, respectively.

The shaft portion 32 sequentially includes a first connecting section 321 which is connected to the rotation drive portion 31, a second connecting section 323 which is connected to the driven portion 33, and an extension section 322 which is connected between the first and second connecting sections 321, 323. As shown in FIG. 8, an end of the shaft portion 32 connected to the rotation drive portion 31 is located within the range of the central angle C1, an end of the shaft portion 32 connected to the driven portion 33 is located with the range of the central angle C2, and the ranges of the two central angles C1, C2 are not fully overlapped.

The configuration of the shaft portion 32 can also be varied as shown in FIGS. 3-6, on the necessary condition that the two ends of the shaft portion 32 are connected at different central angles of the circle C with the rotation drive portion 31 and the driven portion 33, respectively.

Figure 3:
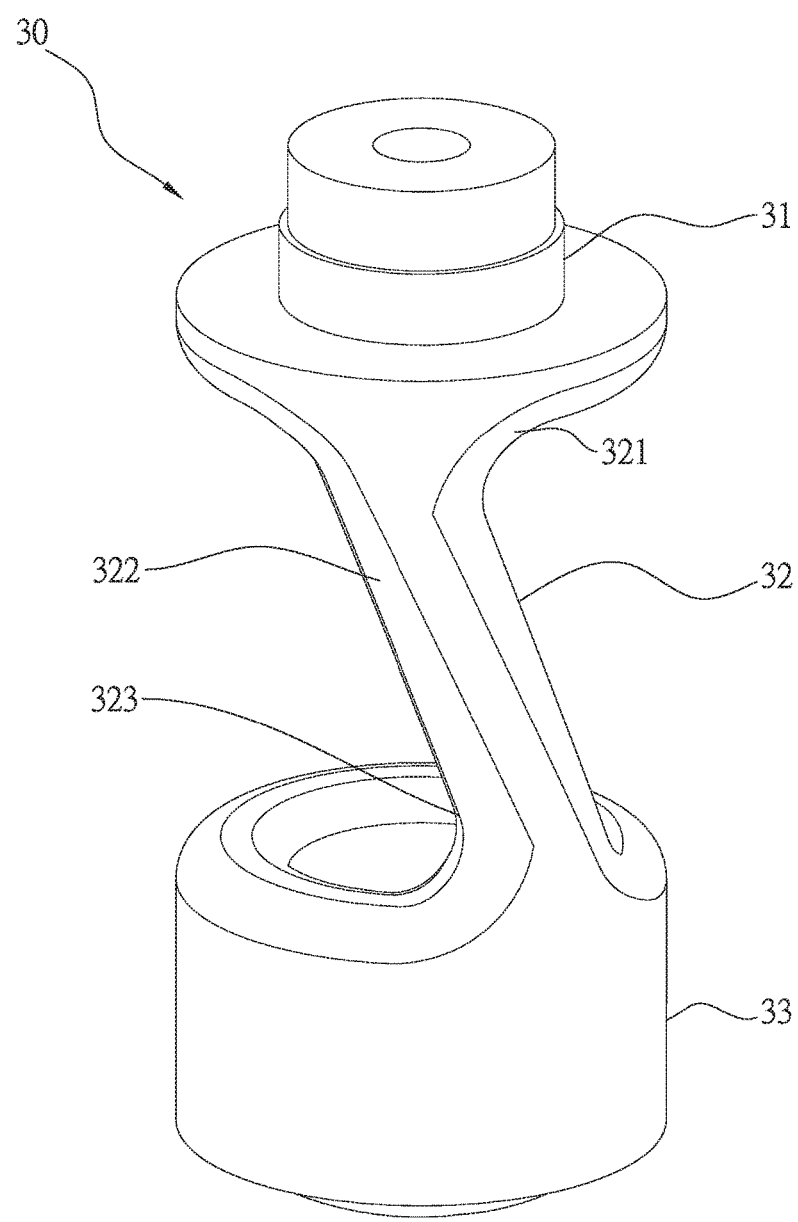
FIG. 3 shows an embodiment of the crankshaft of the rotation drive device in accordance with the preferred embodiment of the present invention.
Figure 4:
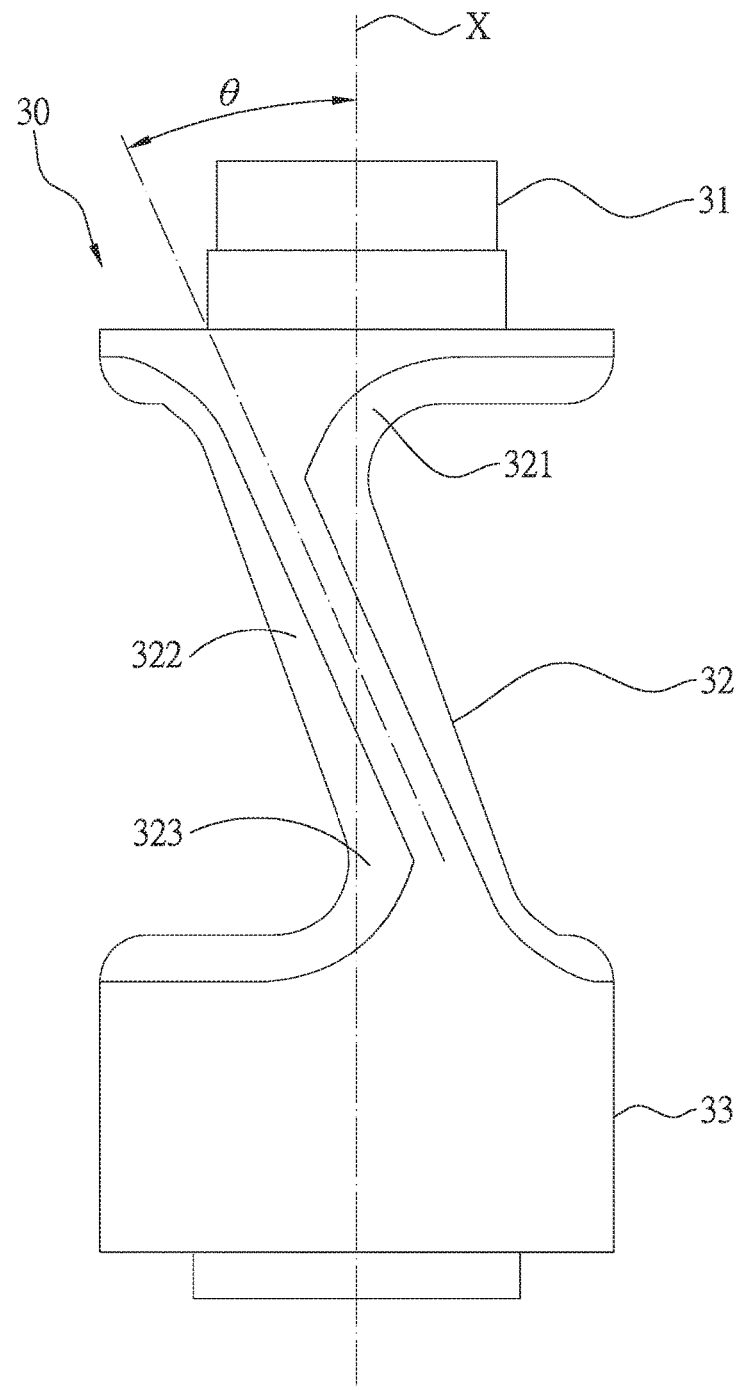
FIG. 4 is a plan view of FIG. 3.

Please refer to FIGS. 3 and 4, the first and second connecting sections 321, 323 extend in an arc-shaped manner, while the extension section 322 extends in an inclined manner. In this embodiment, the extension section 322 extends in a direction at an angle θ to the axial direction X, where θ is smaller than 45 degrees. The reason why the angle θ in this embodiment is designed to be less than 45 degrees is because the crankshaft 30, when subjected to an overload torque, will break along a direction perpendicular to the surface which takes the maximum torque, namely, will break at where the longitudinal axis of the extension section 322 and the axial direction X meet at an angle of 45 degrees. Therefore, the extension section 322 of the present invention is designed to be less than 45 degrees in order to reduce the possibility of breaking.

Figure 5:
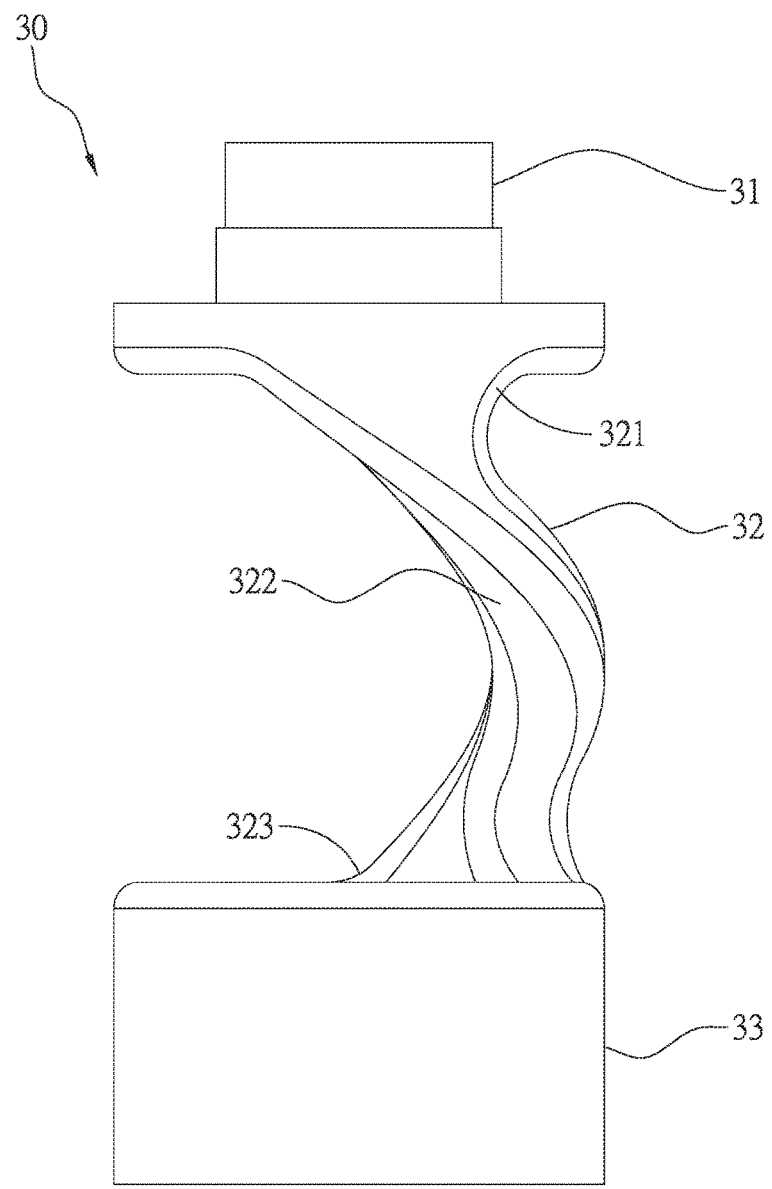
FIG. 5 is a plan view of another embodiment of the crankshaft of the rotation drive device in accordance with the preferred embodiment of the present invention.

FIG. 5 shows that the first connecting section 321, the second connecting section 323 and the extension section 322 all extend in an arc-shaped manner, and the shaft portion 32 has various curvatures which can be negative or positive.

Figure 6:
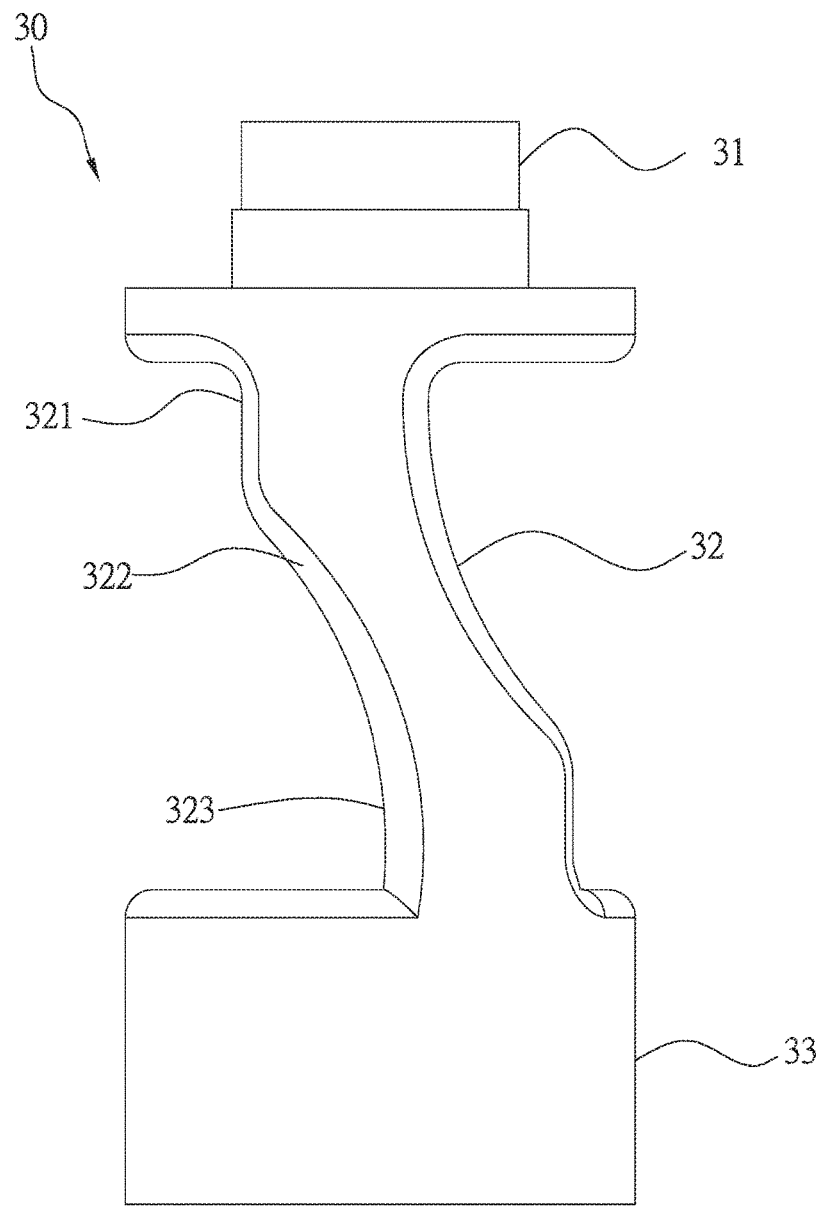
FIG. 6 is a plan view of yet another embodiment of the crankshaft of the rotation drive device in accordance with the preferred embodiment of the present invention.

FIG. 6 shows that each of the first and second connecting sections 321, 323 can include curved surfaces and straight surfaces, and the extension section 322 is arc-shaped.

The driven device 40 is connected to another end of the crankshaft 30 and driven to rotate by the crankshaft 30.

The present invention is suitable for use on various rotating machines. The two ends of the shaft portion 32 are connected to the rotation drive portion 31 and the driven portion 33, respectively, at different central angles of the circle C. The shaft portion 32 does not extend along the outmost periphery of a space between the rotation drive portion 31 and the driven portion 33, but extends inward from an outmost periphery of the space between the rotation drive portion 31 and the driven portion 33, which divides the space into two subspaces which are located two sides of the shaft portion 32, so that the wire L can be arranged in the subspaces at both sides of the shaft portion 32, thus enhancing the flexibility of wire distribution while improving rotation range of motion.

The embodiments of the rotation drive device shown in FIGS. 3-6 all contain the same abovementioned technical features and possess the same functions. On top of that, the first and second connecting sections 321, 323 of the shaft portion 32 shown in FIGS. 3 and 4 are all arc-shaped, so that the connections where the shaft portion 32 meets the rotation drive portion 31 and the driven portion 33 are smooth. As a result, when the crankshaft 30 rotates and contacts the wire L, the friction of the wire L against the crankshaft 30 can be substantially reduced, which consequently reduces the wear rate of the wire L, and the follow-up maintenance cost as well.

The first connecting section 321, the second connecting section 323 and the extension section 322 shown in FIG. 5 are all arc-shaped, so that all the surfaces of the crankshaft 30 that contact the wire L become smooth surfaces, consequently improving protection to the wire L.

Each of the first and second connecting sections 321, 323 shown in FIG. 6 includes curved surfaces and straight surfaces, and the extension section 322 is arc-shaped, so that the straight surfaces of the first and second connecting sections 321, 323 can be used to guide or restrict the distribution of the wire.

Figure 1:
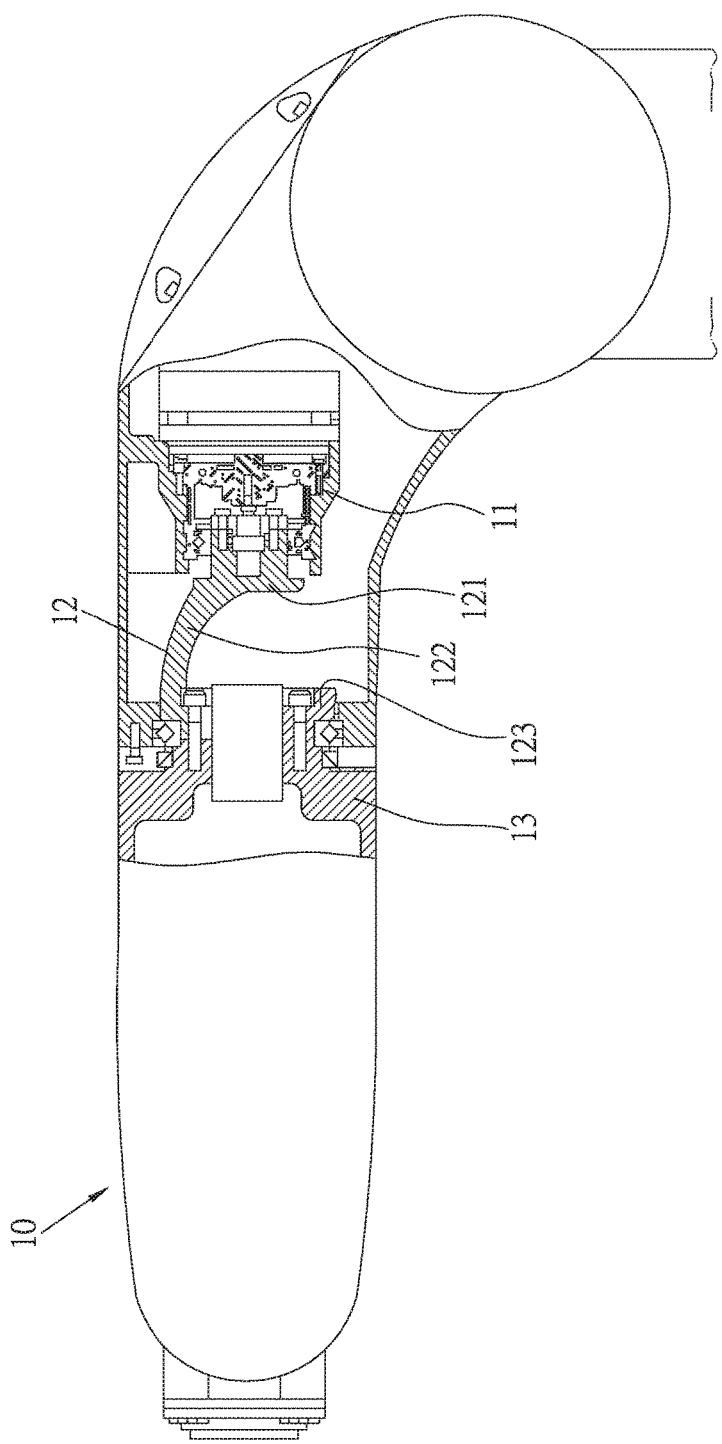
FIG. 1 is a perspective view showing the use of a conventional rotation drive device in a robot arm.
Figure 2:
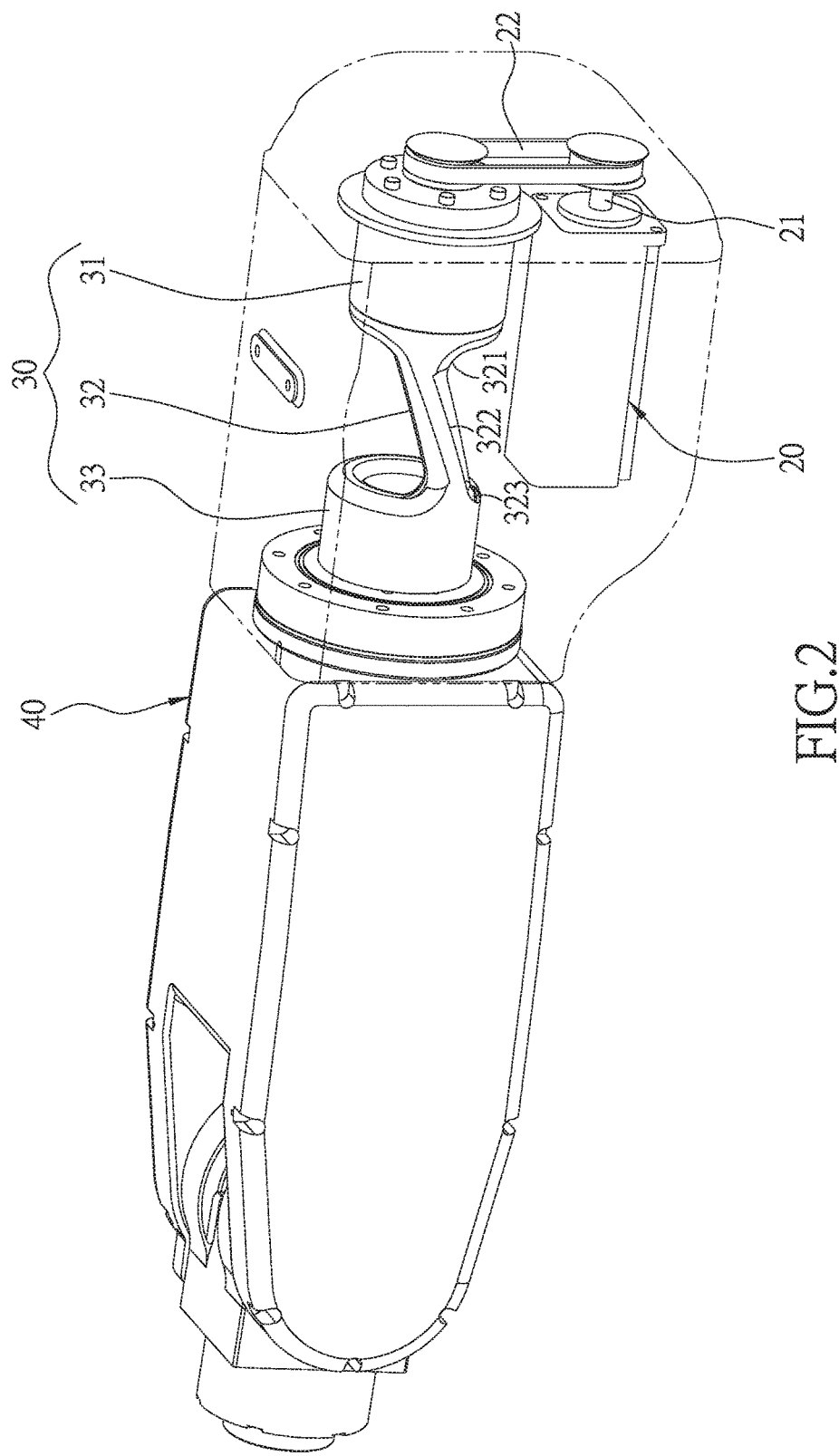
FIG. 2 is a perspective view showing the use of a rotation drive device in accordance with a preferred embodiment of the present invention in a robot arm.
Figure 9:
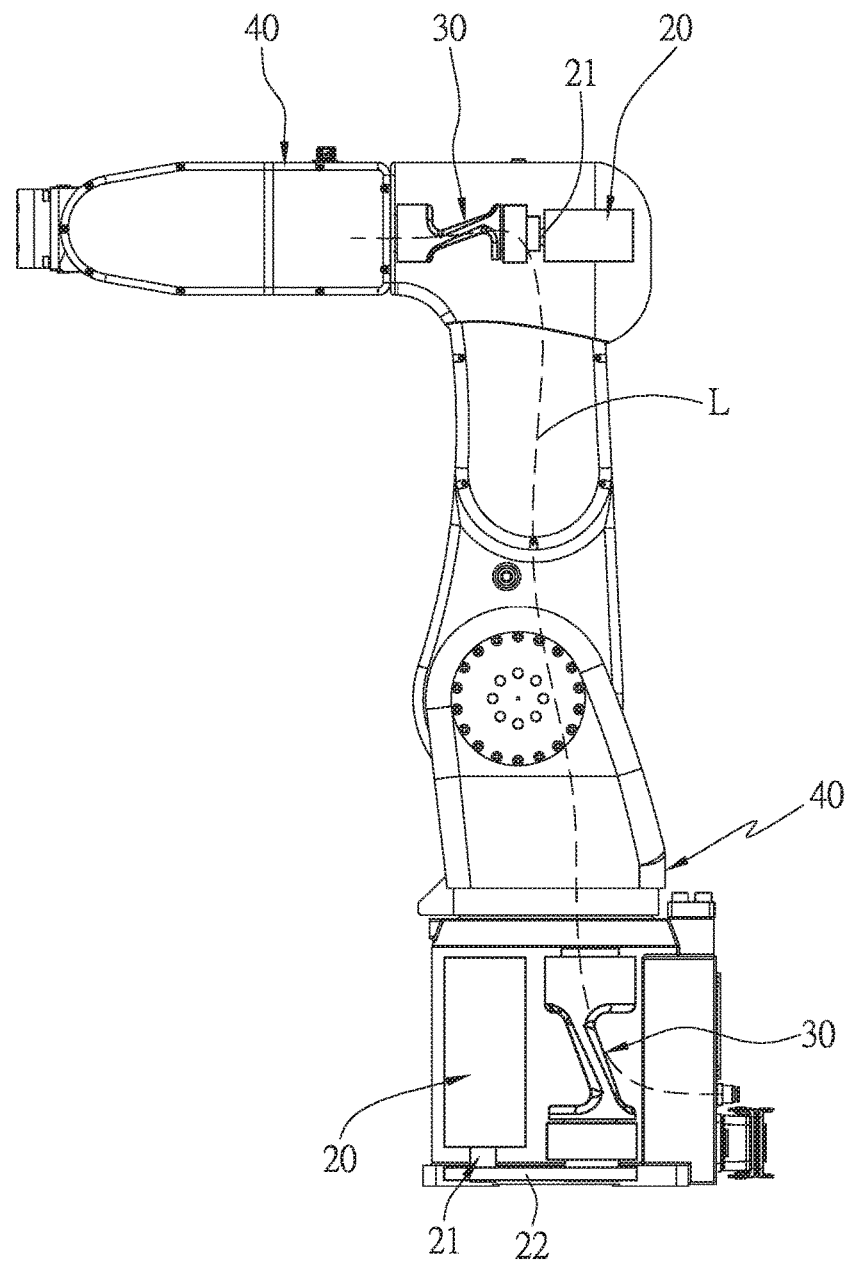
FIG. 9 is a perspective view showing the use of the rotation drive device in accordance with the preferred embodiment of the present invention in a vertical articulated robot.

The rotation drive device of the present invention is suitable for use in various equipments that require rotation for their operation. For example, FIGS. 2 and 9 show the application of the rotation device of the present invention in an arm of a vertical articulated robot to rotate the driven device 40. As shown in FIG. 2, the drive source 20 and the crankshaft 30 are arranged in a parallel manner and then connected with each other by a belt 22, due to the space restriction. If the space allows, the drive source 20 and the crankshaft 30 can also be coaxially arranged, as shown in FIG. 9, where two crankshafts 30 are illustrated as being located at different joints. Different arrangements of the crankshaft 30 provide more alternatives to the distribution of the wire L.

Figure 10:
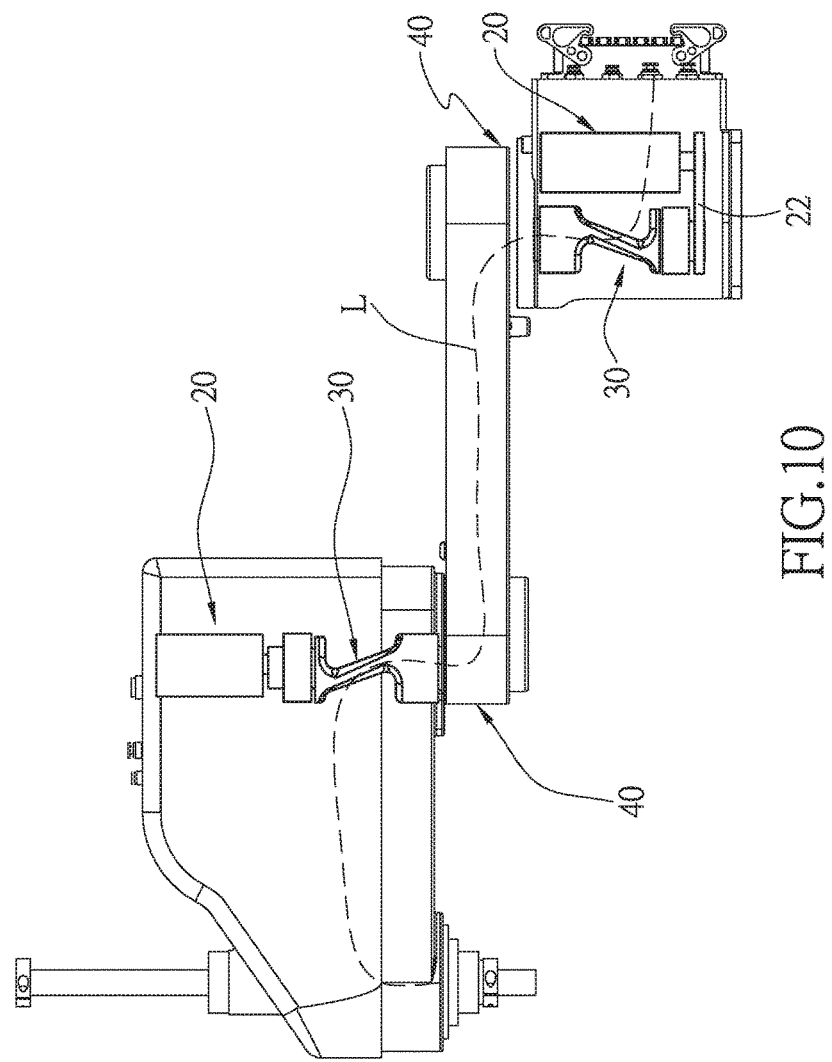
FIG. 10 is a perspective view showing the use of the rotation drive device in accordance with the preferred embodiment of the present invention in a horizontal articulated robot.
Figure 11:
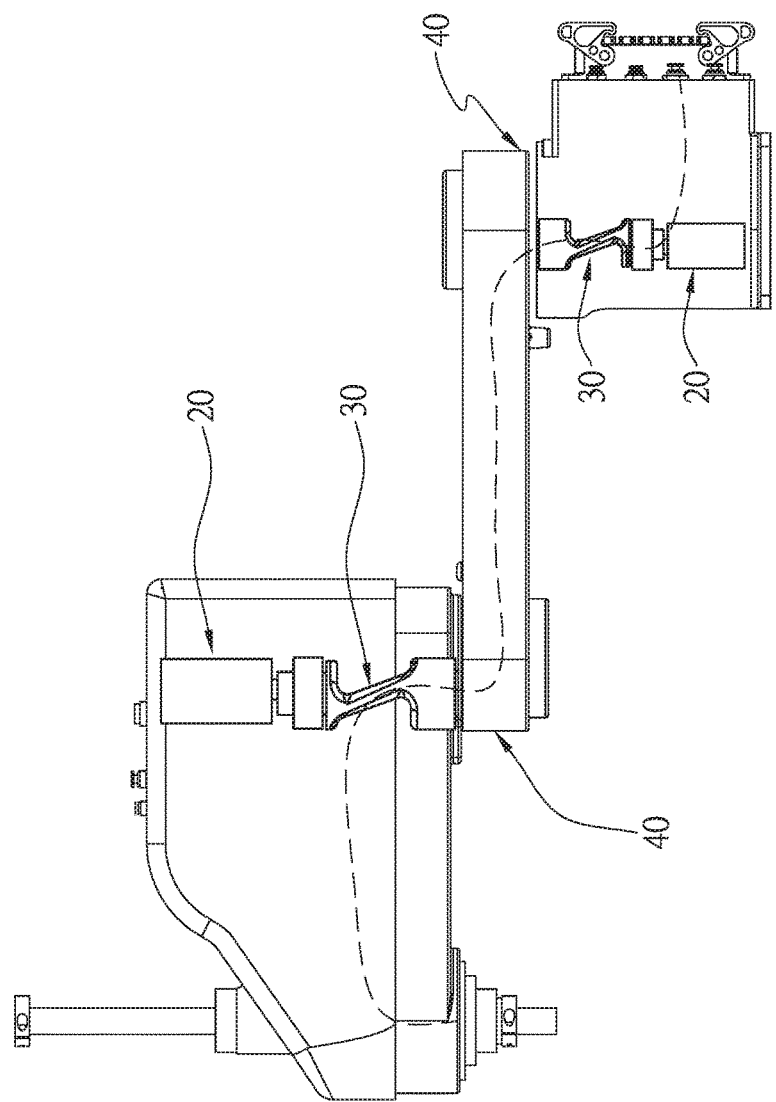
FIG. 11 is another perspective view showing the use of the rotation drive device in accordance with the preferred embodiment of the present invention in a horizontal articulated robot.
Figure 12:
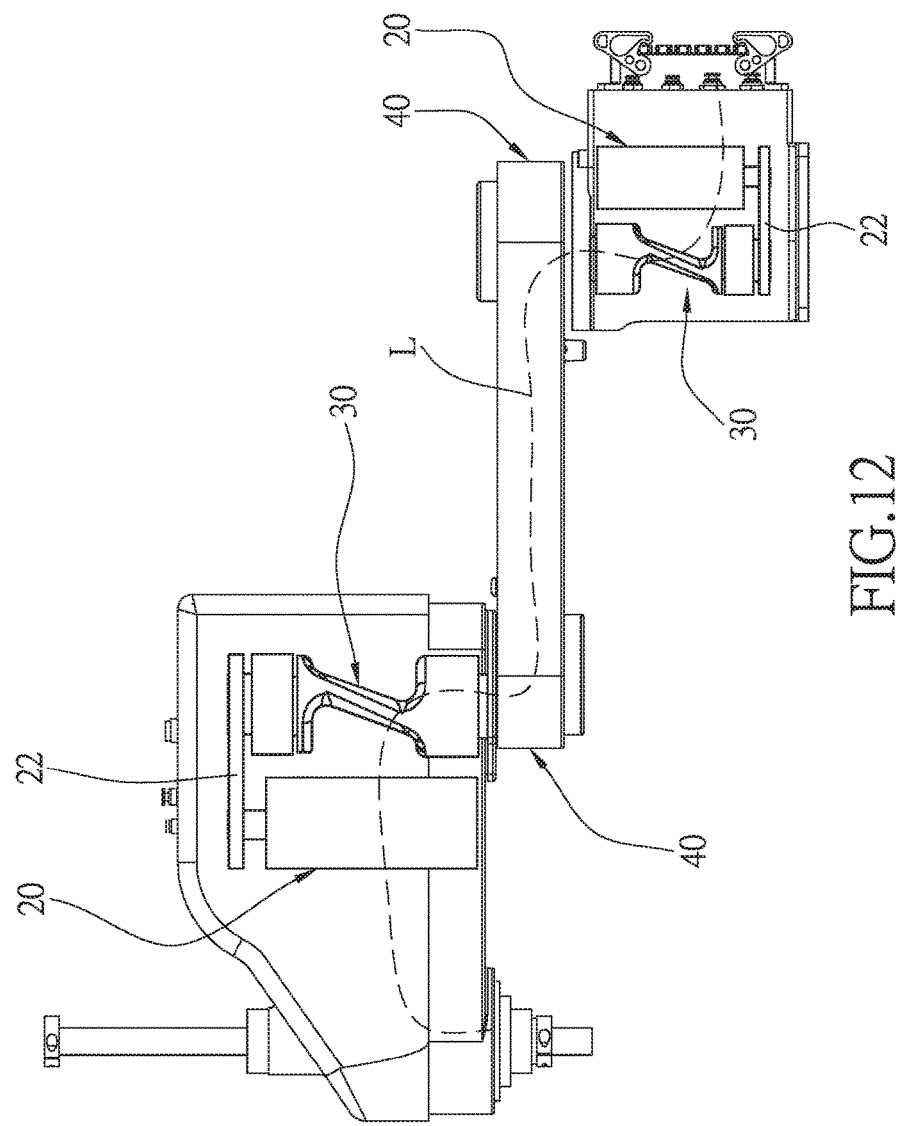
FIG. 12 is yet another perspective view showing the use of the rotation drive device in accordance with the preferred embodiment of the present invention in a horizontal articulated robot.

FIGS. 10-12 show the application of the rotation drive device of the present invention in a horizontal articulated robot, and the drive source 20 and the crankshaft 30 can also be arranged differently according to the size of the space.

In summary, the crankshaft 30 of the present invention structurally changes to make the two ends of the shaft portion 32 connected to the rotation drive portion 31 and the driven portion 33, respectively, at different central angles, which divides the space into two subspaces which are located two sides of the shaft portion 32, so that the wire L can be arranged in the subspaces at both sides of the shaft portion 32, thus enhancing the flexibility of wire distribution while improving rotation range of motion.

While we have shown and described various embodiments in accordance with the present invention, it is clear to those skilled in the art that further embodiments may be made without departing from the scope of the present invention.

What is claimed is:

1. A rotation drive device, comprising:
    a drive source;
    a crankshaft with one end connected to and rotated by the drive source, the crankshaft sequentially including a rotation drive portion, a shaft portion and a driven portion, the shaft portion having two ends connected to the rotation drive portion and the driven portion, respectively, the rotation drive portion including a terminal-end-surface center point formed at a center of a terminal end surface of the rotation drive portion, the driven portion including a terminal-end-surface center point formed at a center of a terminal end surface of the driven portion, the two terminal-end-surface center points are concentric with each other, wherein a circle is centered on the two terminal-end-surface center points, the two ends of the shaft portion are connected at different central angles of the circle to the rotation drive portion and the driven portion, respectively, the shaft portion sequentially includes a first connecting section connected to the rotation drive portion, a second connecting section connected to the driven portion, and an extension section connected between the first and second connecting sections, wherein a direction connected between the two terminal-end-surface center points is defined as an axial direction, and the extension section extends in a direction at an angle to the axial direction, and the angle is smaller than 45 degrees; and
    a driven device connected to another end of the crankshaft and driven to rotate by the crankshaft.

2. The rotation drive device as claimed in claim 1, wherein each of the rotation drive portion and the driven portion has a circular cross section, and the driven portion is a hollow circular structure.

3. The rotation drive device as claimed in claim 1, wherein each of the first and second connecting sections extends in an arc-shaped manner.

4. The rotation drive device as claimed in claim 1, wherein the extension section extends in an inclined manner.

5. The rotation drive device as claimed in claim 1, wherein the first connecting section, the second connecting section and the extension section all extend in an arc-shaped manner, and have negative and positive curvatures.

6. The rotation drive device as claimed in claim 1, wherein each of the first and second connecting sections includes curved surfaces and straight surfaces, and the extension section is arc-shaped.

7. The rotation drive device as claimed in claim 1, wherein the drive source includes a rotatable drive shaft, and the drive source is connected to the crankshaft by a belt wound around the drive shaft and the crankshaft.

* * * * *